US00RE36725E

United States Patent [19]

Sonehara et al.

[11] E Patent Number: Re. 36,725

[45] Reissued Date of Patent: Jun. 6, 2000

[54] PROJECTION-TYPE DISPLAY DEVICE

[75] Inventors: Tomio Sonehara; Shuji Aruga, both of Suwa; Shinji Morozumi, Shimosuwa-machi, all of Japan

[73] Assignee: Seiko Epson Corporation, Tokyo, Japan

[21] Appl. No.: 08/522,044

[22] Filed: Aug. 31, 1995

Related U.S. Patent Documents

Reissue of:

[64] Patent No.: 5,241,407
Issued: Aug. 31, 1993
Appl. No.: 07/652,476
Filed: Feb. 8, 1991

U.S. Applications:

[63] Continuation of application No. 07/504,703, Apr. 5, 1990, abandoned, which is a continuation of application No. 06/786,438, Oct. 11, 1985, abandoned.

[30] Foreign Application Priority Data

Oct. 22, 1984 [JP] Japan ..... 59-221556
Jul. 31, 1985 [JP] Japan ..... 60-169442

[51] Int. Cl.[7] ..... G02F 1/1335; G02B 27/10; H04N 9/31

[52] U.S. Cl. ..... 349/8; 348/758; 348/761; 359/634

[58] Field of Search ..... 349/5, 8, 7, 9, 349/61, 179; 353/31, 34, 122; 348/750, 757, 758, 761; 359/490, 485, 629, 634

[56] References Cited

U.S. PATENT DOCUMENTS

| | | | |
|---|---|---|---|
| 2,642,487 | 6/1953 | Schroeder | 350/173 |
| 3,588,324 | 6/1971 | Marle | 350/397 |
| 3,840,695 | 10/1974 | Fischer | 358/61 |
| 3,844,650 | 10/1974 | Nicholson et al. | 353/122 |
| 3,876,287 | 4/1975 | Sprokel | 350/347 E |
| 3,910,680 | 10/1975 | Kakeda | 350/347 E |
| 3,986,022 | 10/1976 | Hyatt | 250/205 |
| 4,085,425 | 4/1978 | Hamill | 358/237 |
| 4,108,537 | 8/1978 | Watson et al. | 350/150 |
| 4,127,322 | 11/1978 | Jacobson et al. | 353/31 |
| 4,150,396 | 4/1979 | Hareng et al. | 358/60 |
| 4,191,456 | 3/1980 | Hong et al. | 350/399 |
| 4,222,641 | 9/1980 | Stolov | 353/84 |
| 4,230,408 | 10/1980 | Nigg | 355/33 |
| 4,368,963 | 1/1983 | Stolov | 353/31 |

(List continued on next page.)

FOREIGN PATENT DOCUMENTS

| | | |
|---|---|---|
| 43-29086 | 12/1968 | Japan . |
| 47-4478 | 3/1972 | Japan . |
| 47-16122 | 8/1972 | Japan . |

(List continued on next page.)

OTHER PUBLICATIONS

Morozumi et al "B/W and Color LC Video Displays addressed by Poly Si TFT's" Society for Information Display–pp. 24–27, 1975.

Macleod, H. A., Thin–Film Optical Filters, Adam Hilger Pub, London, pp. 309–311 (1969).

Dewey, Anthony G., Projection Systems For Light Valves, Proceedings of SID, vol. 18/2, pp. 134–146 (1977).

Merchandised Liquid Crystal Pocket Color TV, Nikkei Electronics, (1984), pp. 211–240.

B/W and Color LC Video Display Addressed by Poly Si TFTs, SID International Symposium Digest of Technical Papers, pp. 156–157 (1983).

Projecting Type Display Wherein Improvement Has Been Increased in a High Quality and a Long Life, Nikkei Electronics (1977), pp. 58–91.

*Primary Examiner*—William L. Sikes
*Assistant Examiner*—Tai V. Duong
*Attorney, Agent, or Firm*—Stroock & Stroock & Lavan LLP

[57] ABSTRACT

A projection-type display device having a single light source which produces light. A first dichroic mirror group receives the light and separates it into colored light. A transmissive light valve system modulates the colored light and a second dichroic mirror group synthesizes the modulated colored light. A projection system projects the synthesized colored light onto a screen.

33 Claims, 5 Drawing Sheets

U.S. PATENT DOCUMENTS

| | | | |
|---|---|---|---|
| 4,425,028 | 1/1984 | Gagnon et al. | 350/337 |
| 4,435,732 | 3/1984 | Hyatt | 358/254 |
| 4,461,542 | 7/1984 | Gagnon | 350/408 |
| 4,471,385 | 9/1984 | Hyatt | 358/230 |
| 4,544,237 | 10/1985 | Gagnon | 350/408 |
| 4,715,684 | 12/1987 | Gagnon | 350/408 |
| 4,739,396 | 4/1988 | Hyatt | 358/60 |

FOREIGN PATENT DOCUMENTS

| | | |
|---|---|---|
| 48-23459 | 3/1973 | Japan . |
| 48-79596 | 10/1973 | Japan . |
| 79596 | 10/1973 | Japan . |
| 49-33524 | 3/1974 | Japan . |
| 49-76645 | 7/1974 | Japan . |
| 49-91226 | 8/1974 | Japan . |
| 49-94228 | 9/1974 | Japan . |
| 50-92756 | 7/1975 | Japan . |
| 51-334 | 1/1976 | Japan . |
| 51-52233 | 5/1976 | Japan . |
| 51-71697 | 6/1976 | Japan . |
| 52-14417 | 2/1977 | Japan . |
| 52-24493 | 2/1977 | Japan . |
| 52-77699 | 6/1977 | Japan . |
| 54-18886 | 7/1979 | Japan . |
| 55-74516 | 6/1980 | Japan . |
| 56-27114 | 3/1981 | Japan . |
| 56-60494 | 5/1981 | Japan . |
| 57-5488 | 1/1982 | Japan . |
| 57-19728 | 2/1982 | Japan . |
| 57-70589 | 5/1982 | Japan . |
| 57-115538 | 7/1982 | Japan . |
| 57-128382 | 8/1982 | Japan . |
| 57-136627 | 8/1982 | Japan . |
| 57-205777 | 12/1982 | Japan . |
| 58-14818 | 1/1983 | Japan . |
| 58-21863 | 2/1983 | Japan . |
| 58-66917 | 4/1983 | Japan . |
| 2916 | 6/1983 | Japan . |
| 3291 | 6/1983 | Japan . |
| 58-97983 | 6/1983 | Japan . |
| 58-150937 | 9/1983 | Japan . |
| 58-209720 | 12/1983 | Japan . |
| 58-223185 | 12/1983 | Japan . |
| 59-7928 | 1/1984 | Japan . |
| 59-50487 | 3/1984 | Japan . |
| 59-101378 | 6/1984 | Japan . |
| 59-131278 | 7/1984 | Japan . |
| 59-189628 | 12/1984 | Japan . |
| 59-229522 | 12/1984 | Japan . |
| 59-230383 | 12/1984 | Japan . |
| 60-2916 | 1/1985 | Japan . |
| 60-3291 | 1/1985 | Japan . |
| 60-41086 | 3/1985 | Japan . |
| 60-90429 | 6/1985 | Japan . |
| 179723 | 9/1985 | Japan . |
| 60-179723 | 9/1985 | Japan . |
| 60-205526 | 10/1985 | Japan . |
| 61-13885 | 1/1986 | Japan . |
| 61-35481 | 2/1986 | Japan . |
| 62-1391 | 1/1987 | Japan . |

PROJECTION-TYPE DISPLAY DEVICE

Matter enclosed in heavy brackets [ ] appears in the original patent but forms no part of this reissue specification; matter printed in italics indicates the additions made by reissue.

This is a continuation of application Ser. No. 07/504,703, filed Apr. 5, 1990, now abandoned, which itself is a continuation of application Ser. No. 06/786,438, now abandoned, filed Oct. 11, 1985.

BACKGROUND OF THE INVENTION

The present invention generally relates to a projection-type color display device and, in particular, to a projection-type color display device which uses a plurality of light valves for forming picture images.

There are several versions of projection-type color display devices which utilize a light valve. For example, U.S. Pat. Nos. 4,461,542 and 4,425,028 disclose a color display device in which a reflecting light valve and dichroic mirrors synthesize and project monochromatic pictures. A color display device which uses an oil-membrane light valve is disclosed in an article entitled "Matrix-Addressed Liquid Crystal Projection Display" published in the 1972 Society for Information Display (SID) at pp. 62–63, and in an article entitled"Recent Advances in the Single-Gun Color Television Light-Valve System" published in the 1975 SID at pp. 24–27. An article on the relevant technology entitled"Optical Properties of a Liquid-Crystal Image Transducer at Normal Incidence: Mathematical Analysis and Application to the Off-State" can be found in J.Opt.Soc.Am., Vol 70, No. 3, March 1980 beginning at page 287.

The conventional projection-type color display devices have several deficiencies. In a device using a reflecting light valve: first, the reflected light at the surface of the light valve causes deterioration of the contrast of the displayed images; second, since the light valve is addressed by the light from a cathode ray tube (CRT), the device inevitably becomes large and complex, and; third, there is the requirement for an excellent polarized light dividing characteristic as well as a colored light dividing characteristic of the dichroic mirror.

In the second device using an oil-membrane light valve, the device is large, complex and expensive and is less than satisfactory with respect to its life span and utilizing efficiency of the light.

Accordingly, the present invention was developed to eliminate the problems in the prior art as described above and to provide a small-sized projection-type color display device which is excellent in the contrast of the displayed pictures and in the utilizing efficiency of the light from the light source.

SUMMARY OF THE INVENTION

Generally speaking, in accordance with the present invention, a projection-type display device is provided. The display device includes a first dichroic mirror group which divides light from a light source into a transmitted light and a relected light according to the wavelength thereof. The device also includes transmissive light valves which develop the picture images and which modulates the divided light flux, a second dichroic mirror group for synthesizing the light flux transmitted through the light valve and a projection optical system for projecting the synthesized light flux.

The light length selecting characteristic of the first and second dichroic mirror groups may be almost equal so that the light flux separated by the first dichroic mirror group is synthesized by the second dichroic mirror group in the present invention. Moreover, each of the first and the second dichroic mirror groups may consist of a plurality of mirrors which effect segregation and synthesis of the primary colors of red, blue and green.

The first and the second dichroic mirror groups may also have a different wavelength selecting characteristic from each other and may be arranged in a cross in one common plane. Moreover, in accordance with the present invention, the transmissive light valves may have a maximum extinction ratio with respect to the main wavelength of the colored light passing therethrough. Furthermore, the ray transmitting direction of the light valves for the passing colored light may be inclined with respect to the normal line of the surface plane of the light valve, thereby most effectively utilizing the incident light angle dependency of the extinction ratio.

Accordingly, it is an object of the present invention to provide an improved projection-type display device.

Another object of the present invention to provide a projection-type display device which utilizes the properties of a light valve to project images.

Yet another object of the present invention is to provide a projection-type display device which is small in size.

A further object of the present invention is to provide a projection-type color display device which provides an excellent contrast in the pictures displayed.

A still further object of the present invention is to provide a projection-type color display device which has an excellent utilizing efficiency of the light produced by the light source.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description take in connection with the accompanying drawings, in which.

DESCRIPTION OF THE PREFERRED EMBODIMENTS

Figure 1:
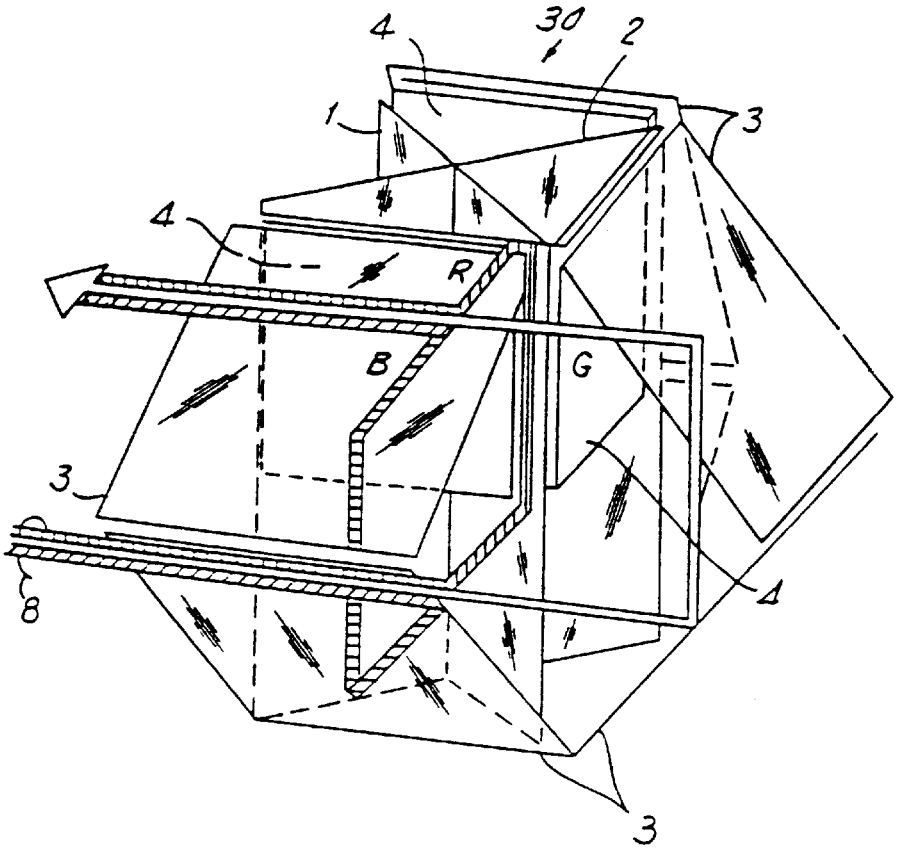
FIG. 1 is a diagramatic representation of an illuminating system of a full-color projection-type display device constructed in accordance with the present invention.

The principle of the function of the present invention is first described. Thereafter, specific embodiments will be described with reference to the drawings.

Light emitted from a light source is segregated into a plurality of colored lights by a first dichroic mirror group. Thereafter, a transmissive light valve corresponding to the colored light develops a picture image and the colored lights are picturemodulated. The transmissive light valve removes the bad influence of the reflected light at the surface of the light valve which is unavoidable in the case using a reflection light valve. Accordingly, the transmissive light valve improves the contrast of the displayed pictures.

Furthermore, the picture display panel driven by the electro-optical effect realizes a motion picture image. The electro-optical material such as liquid crystal, PLZT and the like can be used in the light valve. In any case, compared with the reflection light valve in which the image is written by a light beam from a CRT, and an oil-membrane light valve, the use of the transmissive light valve which is thin and small provides more freedom of construction of the display device and makes it possible to obtain a small display device.

The picture-modulated colored lights are synthesized by a second dichroic mirror group. The second dichroic mirror group may be of the same wavelength selecting characteristic as the first dichroic mirror group, so that the second dichroic mirror group synthesizes the separated colored lights reversibly.

For example, for the first dichroic mirror group for separating a white color light into red, green and blue lights, the corresponding second dichroic mirror group has a red, green and blue light segregating characteristic almost equal to that of the first dichroic mirror group and synthesizes the red, green and blue colored lights including the picture information of the corresponding color (hereinafter referred to as the colored picture lights) reversibly. If all of the used light valves are transmissive, the synthesized light is the same color as the light from the light source. In the present invention, the only necessary ability of the dichroic mirror is to segregate the light into the colored lights. The ability to separate the polarized light component, which is required in the prior art, is not necessary in the present invention.

As described above, since the light from the light source is separated into colored lights and the separated colored lights are modulated and synthesized, there is no need to provide a plurality of light sources corresponding to the light of each color. One single light source is sufficient for use in the present invention.

Next, the synthesized colored picture light is focused into an image through a projection lens onto a screen. Since a plurality of colored lights are synthesized, the picture corresponding to each color must be accurately positioned. For example, in the case of a full-color display using the primary colors of red, green and blue, pictures of each primary color are synthesized while insuring good convergence.

By arranging the first and the second dichroic mirror groups having the different colored light dividing characteristics with each other in a cross arrangement, the length of the light which passes between the light source and the light valve, and between the light valve to the projecting optical system, are shortened. Also, by providing the dichroic mirror groups in one common plane, a thin and small-sized projection-type display device is obtained.

In the present invention, the transmissive light valve may have a wavelength dependency of the extinction ratio which coincides with the main wavelength of the colored light passing therethrough. This improves the contrast of the picture images obtained by synthesizing and projecting the colored light through the light valve. For example, where using the twisted nematic liquid crystal mode (hereinafter referred to as "TN liquid crystal mode"), the peak of the wavelength-light transmittance curve due to the retardance thereof is made to coincide with the main wavelength of each colored light. As another example, where using the guest-host liquid crystal mode, the peak of the dichroism ratio of the dichroic pigment is made to coincide with the main wavelength of each colored light.

Table 1 shows the wavelength dependency of the mode of the light valve. In this invention, the light valve may be constructed so that the parameters such as thickness and pigment used are changed such that the main wavelength of each colored light is appropriate for the wavelength dependency indicated in Table 1.

TABLE 1

Figure 7:
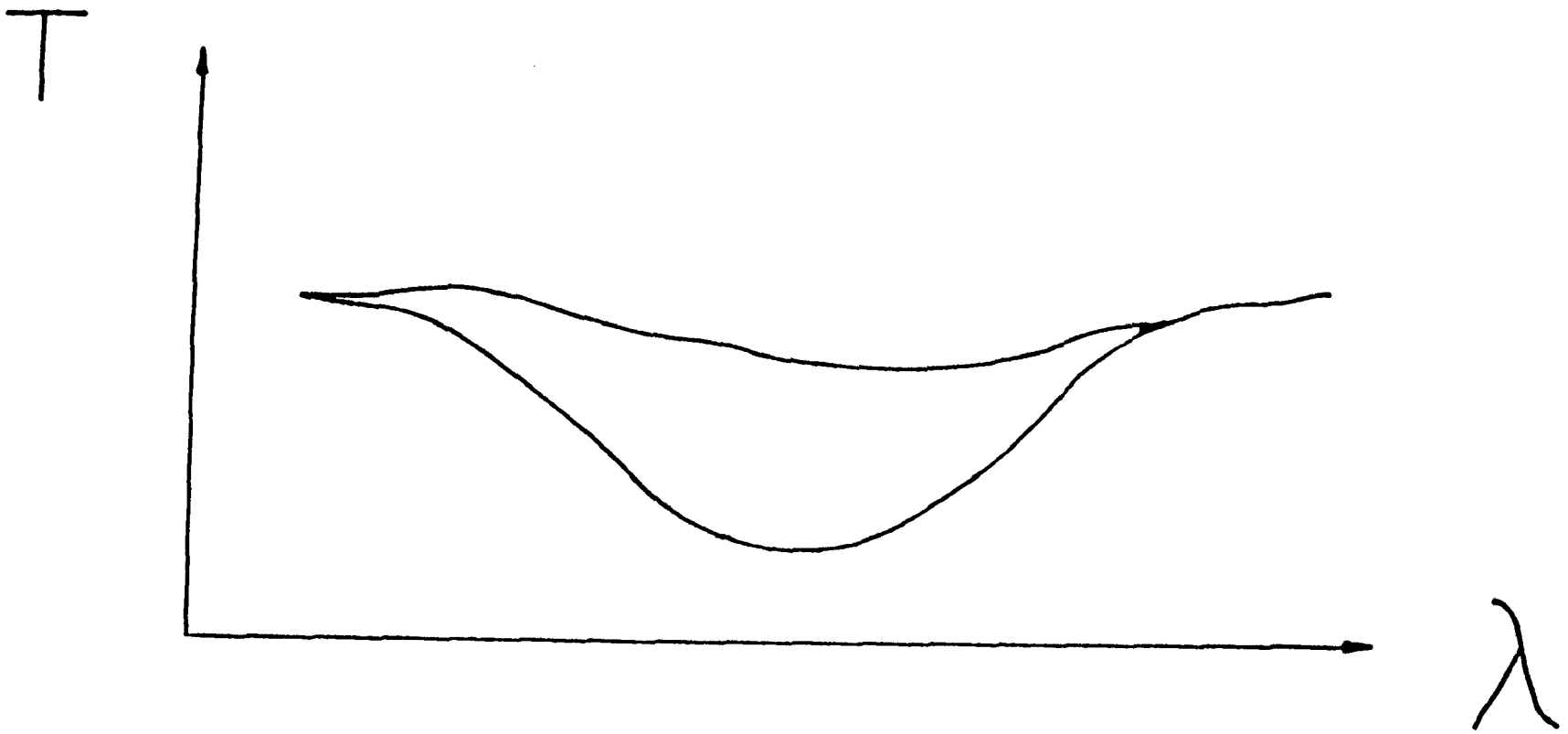
*FIG. 7 is a graph depicting the wavelength dependency in the guest host mode.*

| Light Valve Mode | Wave Length Dependency |
|---|---|
| TN Liquid Mode | Birefringence of Liquid Crystal (Δn) $T = \frac{\sin^2\left[\frac{\pi}{2}(1-u^2)^{1/2}\right]}{1+u^2}$ (Parallel Nicol) $u = \frac{2\cdot\Delta n\cdot d}{\lambda}$ T: transmittance λ: wave length d: thickness |
| Birefringence Mode | Birefringence of Material (Δn) $T = K\sin^2\left(\frac{\pi\cdot\Delta n\cdot d}{\lambda}\right)$ K: constant |
| Guest-Host Mode | Absorption Characteristic of Dichroic Pigment *See FIG. 7.* [ 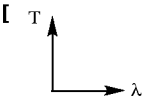 example ] |
| Color Polarizer TN Liquid Crystal Mode | Polarizing-Wave Length Characteristic of Color Polarizer |

Furthermore, in the present invention, the transmissive light valve may have a ray transmitting direction of the colored light passing therethrough which inclines by an angle of between 0° to 45° with respect to the normal line of the surface plane of the light valve. Namely, the light valve surface may be inclined so as to increase the extinction ratio in view of the incident light angle dependency of the extinction ratio of the transmissive light valve. Examples of the light valve modes having the incident light angle dependency are the TN liquid crystal mode, the guest-hose mode and birefringence mode in Table 1.

The present invention is now explained in detail with reference to the drawings. Reference is first made to FIG. 1 which depicts an illuminating structure generally indicated at 30 of a full-color projection-type display device, constructed in accordance with the present invention. In FIG. 1, a dichroic mirror group for reflecting blue light (B mirror) 1 and a dichroic mirror group for reflecting red light (R mirror) 2 are arranged in a cross arrangement for performing the segregation and the synthesis of an incident light flux 8. Mirror 3 changes the direction of the light flux, and a transmissive light valve 4 develops the picture images corresponding to red, green and blue. In this embodiment, the liquid crystal panel of the active-matrix (such as a thin film transistor (TFT) matrix) driving method is used as the light valve 4.

Figure 2:
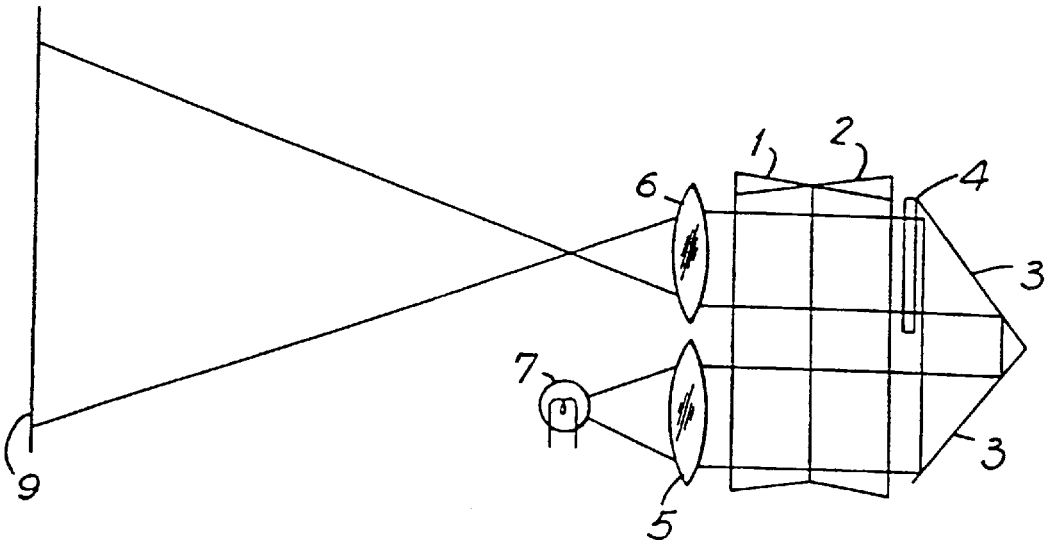
FIG. 2 is a schematic diagram depicting the structure of a projection-type display device in which the illuminating system of FIG. 1 is utilized.

Reference is now also made to FIG. 2 in which a display device [generally indicated at 40] including the projection optical system of FIG. 1 is schematically depicted. FIG. 2 shows only a green light beam segregation for simplification. As an illuminating system, Kohler illumination, a critical illumination, a telecentric illumination or the like may be used. The system includes a condenser lens 5, a projection lens 6, a light source 7 and a screen 9.

The principle of the device in accordance with the present invention is explained with reference to FIGS. 1 and 2. As shown, light source 7 (for example, a halogen lamp) emits a white light which is condensed by condenser lens 5. White light 8 which enters into dichroic mirror groups 1 and 2 are separated into the red (R), green (G) and blue (B) lights, the direction of which is changed by mirror 3 and the colored lights enter into transmissive light valve 4. The surface of light valve 4 is dereflection-coated so as to effectively transmit the incident light.

Light valve 4 is positioned so that the images are focused through projection lens 6 onto screen 9 and develops the picture images corresponding to each colored light. In this embodiment, the video signals of red, green and blue (shown as 18 in the circuit of FIG. 6) are delivered to each liquid crystal panel to form the monochromatic dynamic picture images.

In the present embodiment, a liquid crystal panel of the TN liquid crystal mode is used. According to the wavelength dependency as shown in Table 1 above, the nematic liquid crystal material of $\Delta n=0.15$ is used and the thicknesses of the liquid crystal layers of the red, green and blue light valves are defined to 8.4 $\mu$m, 7.1 $\mu$m and 5.8 $\mu$m, respectively, to make the main wavelength of each colored light coincide with the second peak of the wavelength-light transmittance characteristic of the liquid crystal material. Herein, the thickness of each liquid crystal layer is defined by taking into account the constant temperature after the projection light is applied to the panel.

Figure 3:
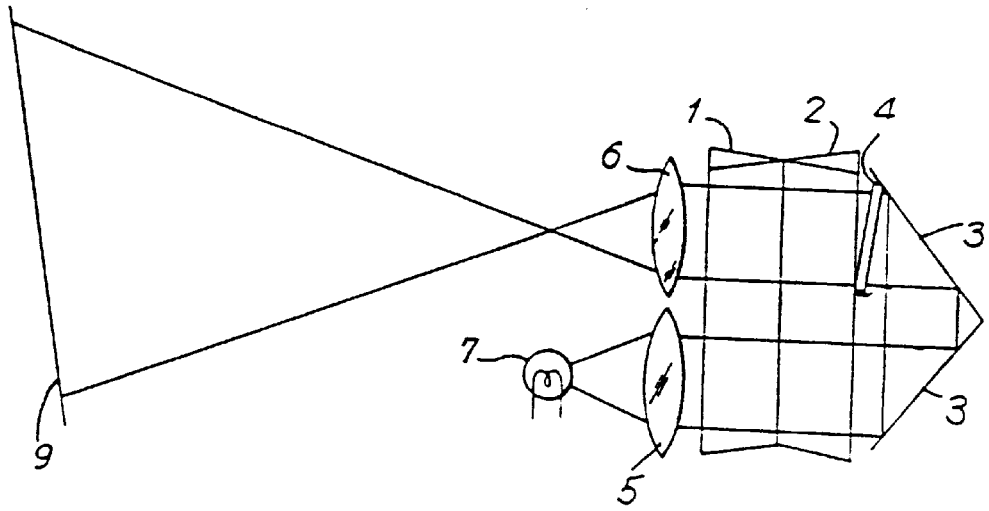
FIG. 3 is a schematic diagram similar to FIG. 2 in which an inclined light valve is utilized.

Since the TN liquid crystal mode presents the incident light angle dependency of the extinction ratio, it is effective to provide the light valve so that the direction of the incident light inclines with respect to the normal line to the surface plane of the light valve. However, in such a case as this, as the light deviates from the optical axis of the projecting lens, the images may be focused on the position which deviates from the optical axis and focused in a trapezoidal shape. The angle of the inclination of the light valve is determined according to the physical properties and the focusing range of the projecting lens. For the liquid crystal panel of the TN liquid crystal mode used in this embodiment, the practical angle by which the light valve is inclined should be between 0° and 30°. Such an arrangement is shown in FIG. 3.

Figure 6:
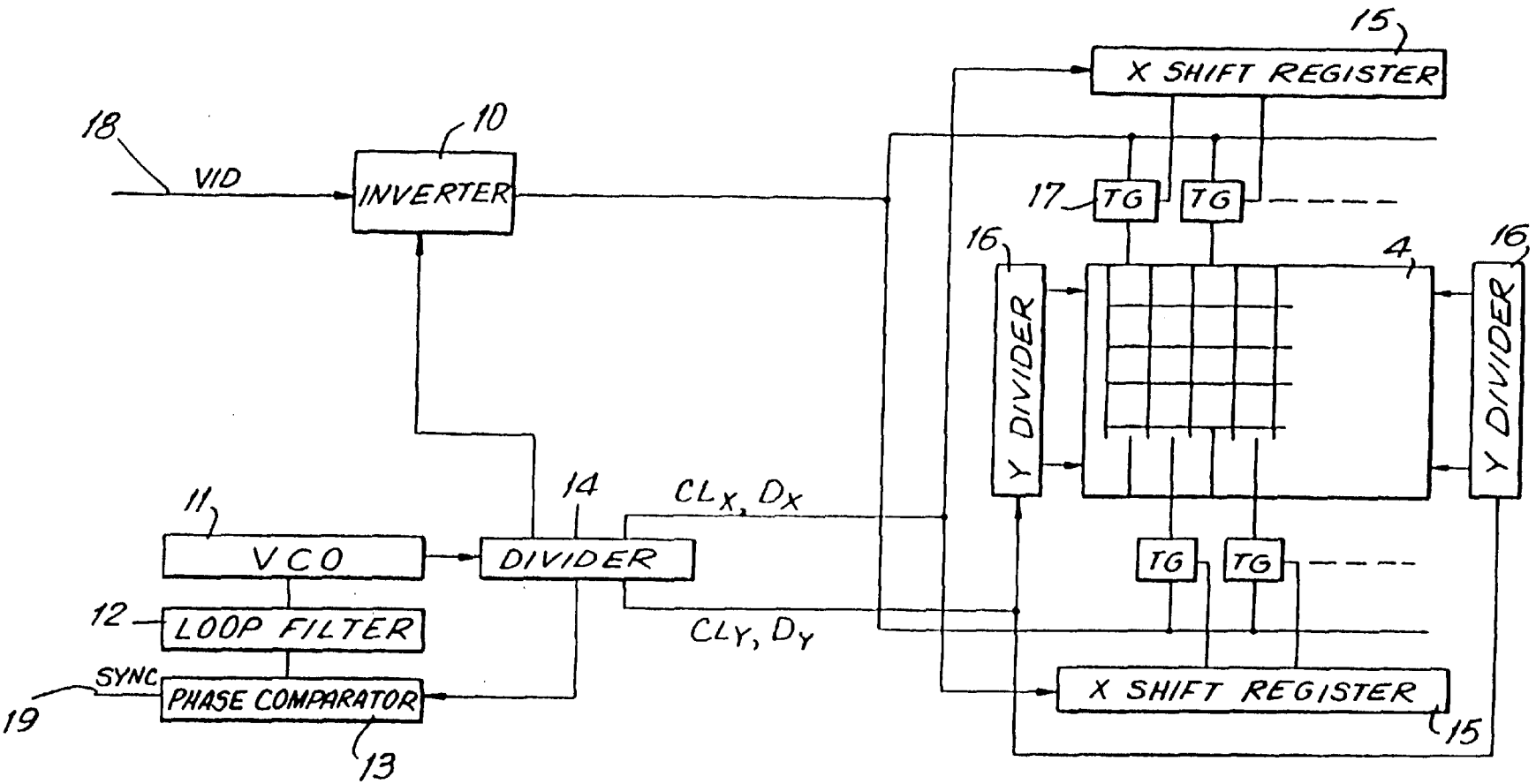
FIG. 6 is a schematic circuit diagram for explaining the driving method of the light valve used in the present invention*; and,*

Reference is now made to FIG. 6 which will be used to explain the driving method of the TFT liquid crystal panel used as transmissive light valve 4 in FIG. 2.

Since alternating current driving is required for the liquid crystal panel, the phase of the video signal 18 is inverted in every other field (F) by a polarity inverter circuit 10. A synchronizing controller circuit consists of a voltage controlled oscillator (VCO) 11, a loop filter 12, a phase comparater 13 and a divider 14, and produces clock and data signals X and Y and the onefield (1F) signal.

An X-side shift register 15, a transmission gate 17 for delivering the video signals to each picture element and a Y-side shift register 16 are coupled to liquid crystal panel 4. The X-side and the Y-side shift registers address the thin film transistors in the row direction and the column direction, respectively.

By such a structure as above, the picture element voltage corresponding to the video signal is applied to the TFT liquid crystal picture element to realize the picture display. The details of the driving method and the liquid crystal panel utilized are in accordance with the disclosure of Nikkei Electronics No. 351, 1984, p 221 and SID '83 Digest, p 156, which are incorporated by reference herein as though fully set forth.

The liquid crystal panels of each color are positioned so that the displayed pictures coincide on the screen. When the primary colors of red, green and blue are synthesized and the full-color display is to be effected, misconvergence causes color aberration and a color-ghost. Especially when using the matrix panel, the positions of the panels should be determined in a scale less than the pitch between the picture elements which make up such panels in a liquid crystal panel. The "pitch" is the fixed distance between adjacent picture elements. Hence, the positioning of each of the liquid crystal panels should be adjusted with respect to one another [sot ht] *so that* color images from each picture element in each of the panels are superimposed on or synthesized with one another equal to or less than the distance equivalent to the pitch between adjacent picture elements. When the pitch between the picture elements of each color is set, by regularly shifting each panel about a distance equal to a half pitch of the picture elements, the resolution of the panel is enhanced more than the monochromatic panel.

As is apparent from FIG. 1, the R panel image and the B panel image are in the relation of mirror images with respect to the G panel image.

In the present invention, the dichroic mirror only has to function to segregate and synthesize the colored light. However, the reflected light on the dielectric material thin film always includes the polarizing effect. Namely, in FIG. 1, the red and the blue lights contain more vertically polarized components and the green light contains more horizontally polarized components. Accordingly, in the electro-optical effect mode using a polarizer, it is sometimes necessary to adjust the direction of the polarizer. For example, in case where TN (nematic liquid crystal twisted by 90°) liquid crystal display mode is used, in order to use the light flux most efficiently, the polarizers should be arranged so that the transmission axes of the polarizers on the side of the entry of light of the R panel and the B panel are vertical and the transmission axis of the polarizers on the side of the entry of light of the G panel is horizontal in FIG. 1.

Moreover, by determining the direction of the polarizers, the white balance, that is, the strength of each color is adjusted.

The colored light picture-modulated by the transmissive light valve again enters into the dichroic mirror group and the red and green and blue lights are reversibly synthesized.

Finally, the red and green and blue lights are projected and focused in an image on the screen 9 as shown in FIGS. 1 and 2.

Figure 4:
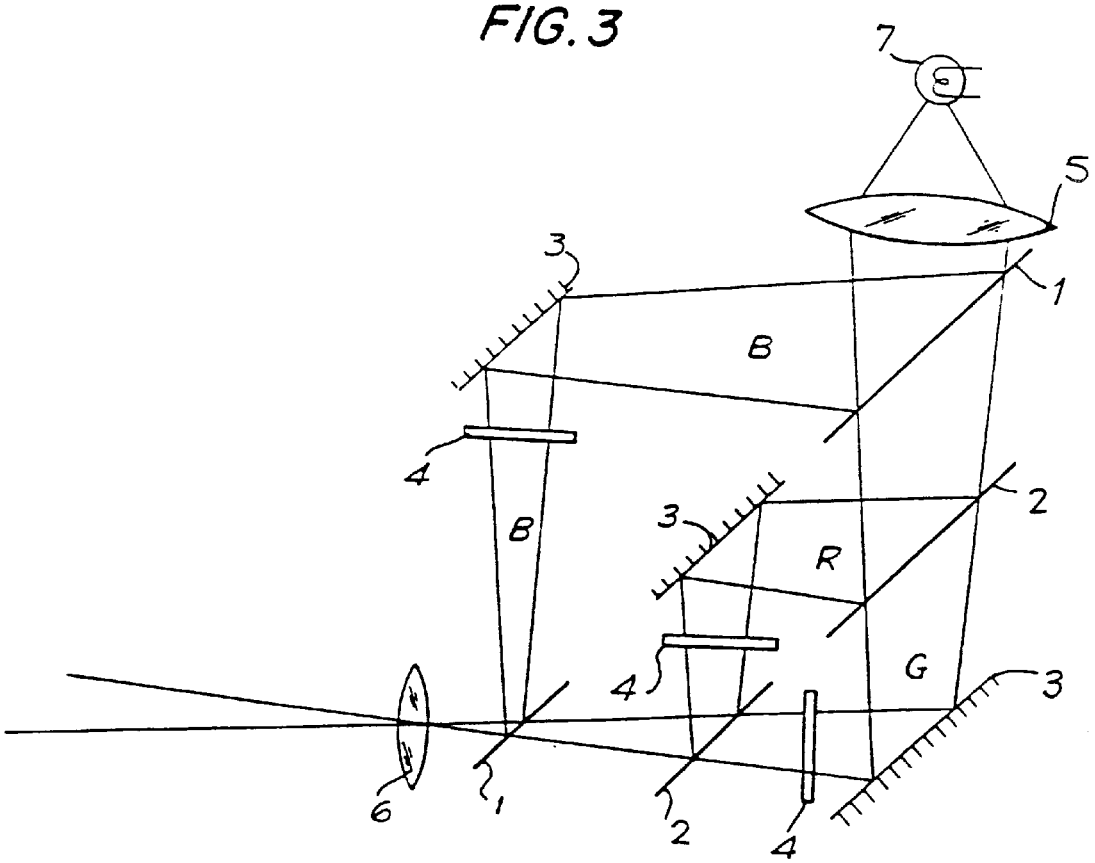
FIG. 4 is a schematic diagram which depicts the plane-arrangement structure of the display device constructed in accordance with an alternative embodiment of the present invention.
Figure 5:
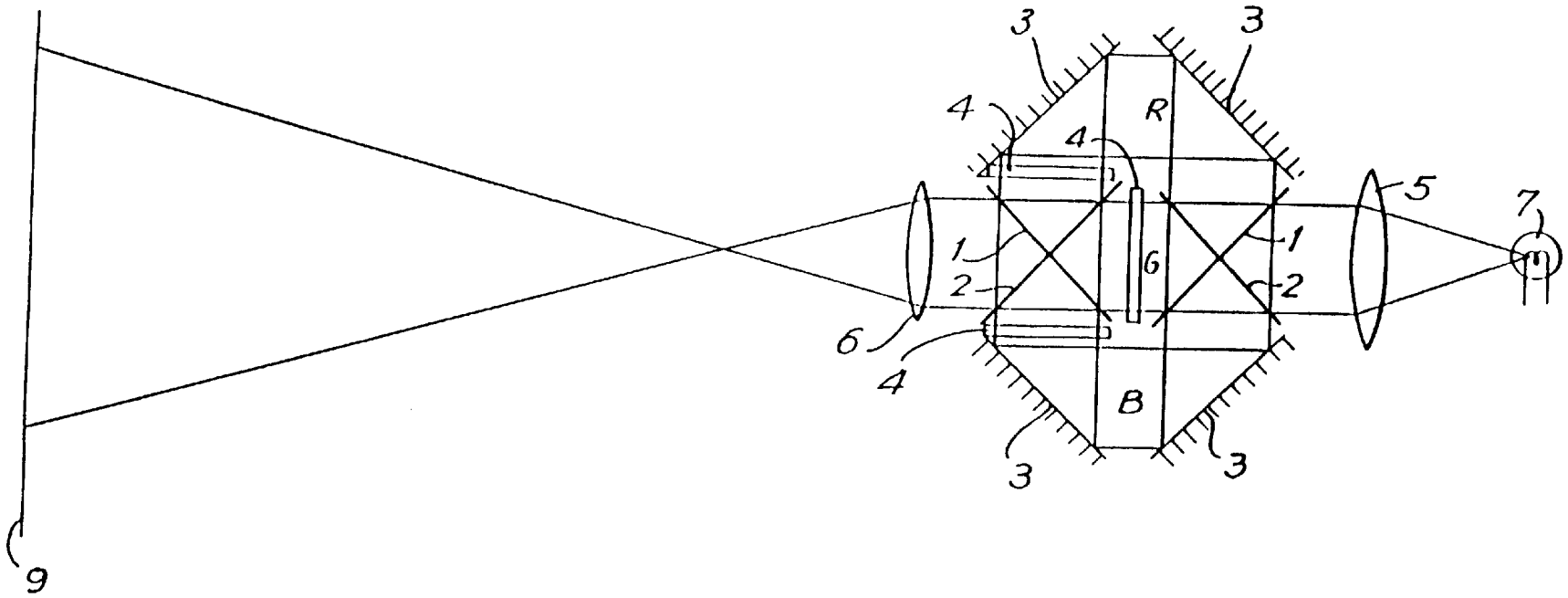
FIG. 5 is a schematic view which illustrates a cross dichroic mirror plane-arrangement structure of a display device constructed in accordance with another alternative embodiment of the present invention; [and,]

The arrangement of the dichroic mirror group is not limited to the one shown by FIG. 1. Other construction examples are shown in FIGS. 4 and 5. In the arrangements of FIGS. 4 and 5, the optical centers of the optical elements including the dichroic mirror groups, light valves and the projecting optical system are positioned in one common plane, such that the principal light rays passing through the optical elements are located in a common plane, thereby providing thinner devices than the arrangement of FIG. 1.

The arrangement of. FIG. 4 is simple in which there is no need to provide the dichroic mirror groups 1 and 2 in a cross. Moreover, mirror 3 for refracting the colored light is also provided on the same plane as the dichroic mirror groups. As in FIG. 1, the system includes a condenser lens 5, a light valve 4 and a projecting lens 6.

FIG. 5 shows an example in which the cross-arranged dichroic mirror groups are provided in a plane. The feature of the arrangement of FIG. 5 is the length of the optical path between light valve 4 and light source 7 and condenser lens 5 is different with respect to each of the red, the blue and the green lights. Furthermore, because the red light and the blue light contain more components which are polarized vertically with respect to the paper surface, the reflection efficiency at mirror 3 for changing the direction of the light is improved.

Light valves 4 corresponding to each colored light in FIGS. 4 and 5 are positioned, similarly to FIG. 1, so that the light valves for all colors are at the focusing position which is at the optically equal distance from projecting lens 6.

As shown by FIGS. 2, 3, 4 and 5, in accordance with the present invention, only a single projecting lens is required and there is no need to adjust the convergence between the picture images of each color when changing the projecting magnification or projecting distance.

In the above description, the TN liquid crystal panel using TFT is used as the transmissive light valve, for example. However, the light valve modes shown in Table 1 can of course be used. Moreover, other light valve modes than those in Table 1 such as the switching phenomenon from a scattering state to a transparent state (the dynamic scattering mode of liquid crystal, etc.), the storing display mode of the liquid crystal and the like may also be applied. Furthermore, the applicable material is not limited to a liquid crystal material, but as long as the material is transmissive, other materials such as of the electro-optical effect of the light-transmissive ceramic including PLZT, electrochromic, electrophoretic and the like may also be used.

Also, in the above embodiment, the primary colors of red, green and blue are separately synthesized. However, other numbers of colors such as 2, or more than 3, is acceptable.

As explained, by using the dichroic mirror groups having a wavelength selecting characteristic which is almost the same as that of the transmissive light valve, the deterioration of the contrast of the display and the color reproductivity caused by the reflected light are avoided and a small-sized projection-type display device is provided in accordance with this invention. Moreover, because of the excellent colored light separating ability of the dichroic mirrors, the projection of the images is realized by a single light source and the light flux is utilized very efficiently. In addition, since one single projection lens is sufficient, the magnification is easily varied. The device of the present invention is further advantageous in that the life of the device is considerably longer without requiring maintenance compared with the conventional high-light flux projecting display device. Also, by sufficiently utilizing the extinction property of the light valve, the pictures of the high contrast and excellent color reproductivity are displayed.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A projection-type display device comprising light source [mean] *means* for producing at least two different colored lights, at least two transmissive flat-type liquid crystal light valves each having first and second sides, each *of* said transmissive flat-type liquid crystal [panel] *light valves* receiving one of said colored lights through a first side thereof and which modulates said colored lights respectively while said colored lights are passing through said respective transmissive flat-type liquid crystal light valves, said transmissive flat-type liquid crystal light valves *each* including a plurality of picture elements arranged in a matrix array in a predetermined pitch each of which is activated by an active element, said transmissive flat-type liquid crystal light valves being oriented with respect to one another *such that the transmitted modulated colored lights of respective picture elements of each light valve overlap with one another* within a distance substantially equal to or less than said predetermined pitch to superimpose the colored images which emerge from said light valves, said transmissive *flat-type liquid crystal* light valves developing picture images corresponding to said colors passing respectively therethrough, a dichroic optical element group which directly receives said modulated colored lights emerging from said second sides of said transmissive flat-type liquid crystal [panels] *light valves* and which synthesizes said modulated colored lights, and projection optical means for directly receiving and then projecting said synthesized colored light.

2. The projection-type display device as claimed in claim 1, wherein said light source means includes a single source of white light.

3. The projection-type display device as claimed in claim 1, wherein said light source means includes a first dichroic optical element group having a first wavelength selecting characteristic, and said dichroic optical element group which directly receives said modulated color lights having a second wavelength selecting characteristic.

4. The projection-type display device as claimed in claim 3, wherein said first and second wavelength selecting characteristics are essentially equal.

5. The projection-type display device as claimed in claim 1, wherein said light source means includes a first dichroic optical element group, said first dichroic optical element group and said dichroic optical element group which directly receives said modulated color lights segregating the light from said light source and synthesizing red, green and blue lights., *respectively*.

6. The projection-type display device as claimed in claim 1, wherein said light source means includes a first dichroic optical element group which is arranged in a cross pattern with respect to said dichroic optical element group which directly receives said modulated color lights.

7. The projection-type display device as claimed in claim 1, wherein said transmissive flat-type liquid crystal light valves have a maximum extinction ratio with respect to the main wavelength of the colored light passing therethrough.

8. The projection-type display device as claimed in claim 1, wherein said dichroic optical element group is arranged in a cross [state] *pattern* and at least one of said flat-type liquid crystal light valves is positioned proximate said dichroic optical element group.

9. The projection-type display device as claimed in claim 1, wherein each of said transmissive flat-type liquid crystal light valves has a thickness and a wavelength-light transmittance characteristic and each colored light has a main wavelength, the thickness of each said transmissive flat-type liquid crystal light valves being different from one another such that the main wavelength of each colored light coincides with the wavelengthlight transmittance characteristic of each respective liquid crystal light valve.

10. The projection-type display device as claimed in claim 1, wherein each of the transmissive flat-type liquid crystal light valves are positioned with respect to one another at a distance equal to about one half the pitch of the picture elements.

11. The projection-type display device as claimed in claim 1, wherein said transmissive flat-type liquid crystal light valves are at a focusing position defined as an optically equal distance from said projection optical means.

12. The projection-type display device as claimed in claim 1, wherein each said active element is a TFT element.

*13. The projection-type display device as claimed in claim 1, wherein said transmissive flat-type liquid crystal light valves are oriented such that corresponding picture elements of said transmissive flat-type liquid crystal light valves operatively cooperate with one another.*

*14. The projection-type display device as claimed in claim 1, wherein said transmissive flat-type liquid crystal light valves are oriented such that said transmitted modulated colored lights overlap with one another within a distance substantially equal to or less than said predetermined pitch.*

*15. The projection-type display device as claimed in claim 1, wherein said dichroic optical element group includes two dichroic planes, each dichroic plane having a wavelength selecting characteristic different from the other and said dichroic planes being arranged in a cross pattern.*

*16. The projection-type display device as claimed in claim 1, wherein said dichroic optical element group comprises two dichroic planes, each said dichroic plane having a wavelength selecting characteristic different from the other and said dichroic planes being arranged substantially parallel to each other.*

*17. A projection-type display device comprising:*

*light source means for producing a plurality of different colored lights;*

*a plurality of transmissive flat-type liquid crystal light valves each having first and second sides,*

*each of said transmissive flat-type liquid crystal light valve receiving one of said colored lights through the first side thereof as incident light, modulating said incident colored light, and transmitting said modulated colored light,*

*said transmissive flat-type liquid crystal light valves each including a plurality of picture elements arranged in a matrix array in a predetermined pitch each of which is activated by an active element;*

*a dichroic optical element group which receives said transmitted modulated colored lights and which synthesizes said transmitted modulated colored lights;*

*said dichroic optical element group including a plurality of dichroic planes each having a wavelength selecting characteristic different from each other,*

*each of said plurality of dichroic planes being arranged substantially parallel to each other, a first one of said dichroic planes synthesizing two of said modulated colored lights emerging from two of said transmissive flat-type liquid crystal light valves and a second one of said dichroic planes synthesizing said synthesized transmitted modulated colored light from said first dichroic plane and another of said transmitted modulated colored lights from another of said transmissive flat-type liquid crystal light valves; and*

*projection means for receiving and then projecting said synthesized transmitted modulated colored light.*

*18. The projection-type display device as claimed in claim 17, wherein said transmissive flat-type liquid crystal light valves are arranged so that said plurality of picture elements are oriented such that said transmitted modulated colored lights overlap with one another within a distance substantially equal to or less than said predetermined pitch.*

*19. The projection-type display device as claimed in claim 17, wherein said light source means includes a single light source and a first dichroic optical element group which separates the light from said single light source into red, green and blue lights, and said dichroic optical element group receives said modulated colored lights and synthesizes red, green and blue lights.*

*20. The projection-type display device as claimed in claim 18, wherein said transmissive flat-type liquid crystal light valves are oriented so that corresponding picture elements of said transmissive flat-type liquid crystal light valves operatively cooperate with one another.*

*21. The projection-type display device as claimed in claim 18, wherein said transmissive flat-type liquid crystal light valves are oriented so that said plurality of picture elements cause said modulated color lights transmitted therefrom to overlap with one another within a distance less than said predetermined pitch.*

*22. A projection-type display device comprising:*

*a colored light source producing a plurality of different colored lights;*

*a plurality of transmissive light valves each modulating a respective one of said plurality of different colored lights;*

*a light synthesizer synthesizing the plurality of different colored lights modulated by said plurality of transmissive light valves and producing a synthesized light, said light synthesizer including a dichroic plane having a wavelength selecting characteristic; and*

*a projection lens projecting the synthesized light,*

*wherein said colored light source, said plurality of transmissive light valves, said light synthesizer and said projection lens are arranged so that optical axes of light fluxes produced by said colored light source and*

*received by said projection lens through said plurality of transmissive light valves and said light synthesizer are positioned substantially coplanar with each other, and so that optical lengths of optical axes of the light fluxes between the respective transmissive light valves and the projection lens are substantially equal to each other.*

*23. The projection-type display device as claimed in claim 22, wherein said colored light source comprises a light source emitting a light and a light separator separating the emitted light into said plurality of different colored lights,*

*said light separator including a dichroic plane having a wavelength selection characteristic, and*

*said light source, said light separator, said plurality of transmissive light valves, said light synthesizer and said projection lens being arranged so that the optical axes of the light fluxes produced from said light source and received by said projection lens through said light separator, said plurality of transmissive light valves and said light synthesizer are positioned substantially coplanar with each other.*

*24. The projection-type display device as claimed in claim 22, wherein said light synthesizer comprises two dichroic planes, each dichroic plane having a different wavelength selection characteristic than the other, said dichroic planes being arranged substantially parallel to each other.*

*25. The projection-type display device as claimed in claim 22, wherein said light synthesizer comprises two dichroic planes, each dichroic plane having a different wavelength selection characteristic than the other and said dichroic planes being arranged in a cross pattern.*

*26. The projection-type display device as claimed in claim 24, wherein said colored light source comprises a light source emitting a light and a light separator separating the emitted light into said plurality of different colored lights,*

*said light separator including two dichroic planes, each dichroic plane having a different wavelength selection characteristic than the other, and*

*said two dichroic planes of said light separator being arranged substantially parallel to each other and said two dichroic planes of said light synthesizer being arranged substantially parallel with each other.*

*27. The projection-type display device as claimed in claim 25, wherein said colored light source comprises a light source emitting a light and a light separator separating the emitted light by the light source,*

*said light separator comprising two dichroic planes, each dichroic plane of said light separator having a different wavelength selection characteristic than the other, and said two dichroic planes of said light separator being arranged in a cross pattern and said two dichroic planes of said light synthesizer being arranged in a cross pattern.*

*28. The projection-type display device as claimed in claim 22, wherein each of said transmissive light valves is a transmissive flat-type liquid crystal light valve.*

*29. The projection-type display device as claimed in claim 28, wherein each said transmissive flat-type liquid crystal light valve is an active matrix type transmissive liquid crystal light valve having thin film transistors as active elements.*

*30. The projection-type display device as claimed in claim 23, wherein said light separator includes at least two dichroic planes, and*

*a first one of said plurality of transmissive light valves modulates a first colored light reflected by a first dichroic plane of said light separator,*

*a second one of said plurality of transmissive light valves modulates a second colored light reflected by a second dichroic plane of said light separator, and*

*a third one of said plurality of transmissive light valves modulates a third colored light transmitted through said first and second dichroic planes of said light separator.*

*31. The projection-type display device as claimed in claim 30, wherein said light synthesizer includes at least a second dichroic plane, and*

*said modulated first colored light is reflected by a first dichroic plane of said light synthesizer,*

*said modulated second colored light is reflected by a second dichroic plane of said light synthesizer, and*

*said modulated third colored light is transmitted through said first and second dichroic planes of said light synthesizer.*

*32. The projection-type display device as claimed in claim 31, wherein said first and second dichroic planes of said light separator and said first and second dichroic planes of said light synthesizer are arranged substantially parallel with each other.*

*33. The projection-type display device as claimed in claim 31, wherein said first and second dichroic planes of said light separator are arranged in a cross pattern, and*

*said first and second dichroic planes of said light synthesizer are arranged in a cross pattern.*

* * * * *